United States Patent
Borley

(10) Patent No.: US 7,597,748 B2
(45) Date of Patent: Oct. 6, 2009

(54) PROCESS TO SEPARATE SOLIDS FROM SOLIDS LADEN GASEOUS FLOW

(75) Inventor: Martin John Hawkins Borley, Amsterdam (NL)

(73) Assignee: Shell Oil Company, Houston, TX (US)

( * ) Notice: Subject to any disclaimer, the term of this patent is extended or adjusted under 35 U.S.C. 154(b) by 492 days.

(21) Appl. No.: 10/561,689

(22) PCT Filed: Jul. 2, 2004

(86) PCT No.: PCT/EP2004/051345

§ 371 (c)(1),
(2), (4) Date: Dec. 22, 2005

(87) PCT Pub. No.: WO2005/002711

PCT Pub. Date: Jan. 13, 2005

(65) Prior Publication Data

US 2006/0144231 A1    Jul. 6, 2006

(30) Foreign Application Priority Data

Jul. 3, 2003    (EP) .................................. 03077101

(51) Int. Cl.
*B01D 45/12*    (2006.01)

(52) U.S. Cl. ............................. 95/271; 55/315; 55/342; 55/345; 55/346; 55/349; 55/466; 95/216; 95/219; 96/301

(58) Field of Classification Search .................... 55/315, 55/342, 345, 346, 349, 466; 95/216, 219, 95/271; 96/301; 422/139–147

See application file for complete search history.

(56) References Cited

U.S. PATENT DOCUMENTS

| 3,541,766 | A |   | 11/1970 | Wilson ........................ 55/348 |
| 3,753,337 | A | * | 8/1973  | Shaw et al. .................... 96/297 |
| 4,208,384 | A |   | 6/1980  | Mitchell ..................... 423/220 |
| 4,286,973 | A |   | 9/1981  | Hamlin et al. ................. 55/92 |
| 4,328,011 | A | * | 5/1982  | Geidies et al. ................ 95/202 |
| 4,501,820 | A |   | 2/1985  | Allan et al. .................... 502/27 |
| 4,556,479 | A |   | 12/1985 | Mauleon et al. ............. 208/164 |

(Continued)

FOREIGN PATENT DOCUMENTS

EP    0105939    4/1984

OTHER PUBLICATIONS

International Search Report dated Nov. 10, 2004 (PCT/EP2004/051345), 3 pages.
International Preliminary Report on Patentablity (PCT/EP2004/051345), 6 pages.
Hydrocarbon Processing, Jan. 1985, pp. 51-54.

*Primary Examiner*—Duane Smith
*Assistant Examiner*—Dung Bui
(74) *Attorney, Agent, or Firm*—William E. Hickman

(57) ABSTRACT

A process to separate solids from a solids laden gaseous flow containing more than 100 mg/Nm$^3$ solids by separating solids from the gaseous flow using a gas-solids separator resulting in a gaseous flow containing less than 50 mg/Nm$^3$ solids and an underflow having the separated solids and part of the gaseous flow as fed to the gas-solids separator; separating part of the solids from the underflow in a cyclone wherein solids and a gaseous flow containing still some solids are obtained; contacting the gaseous flow obtained with water to separate the solids and obtain a gaseous flow containing between 0 and 50 mg/Nm$^3$ solids; and combining the gaseous flows which are poor in solids.

9 Claims, 1 Drawing Sheet

U.S. PATENT DOCUMENTS

| | | | |
|---|---|---|---|
| 4,838,898 A * | 6/1989 | Mifflin et al. | 48/210 |
| 5,372,707 A | 12/1994 | Buchanan et al. | 208/161 |
| 5,514,271 A | 5/1996 | Buchanan et al. | 203/113 |
| 5,690,709 A | 11/1997 | Barnes | 55/348 |
| 6,174,339 B1 | 1/2001 | Varady | 55/348 |
| 6,551,565 B2 | 4/2003 | Confuorto et al. | 423/239.1 |

* cited by examiner

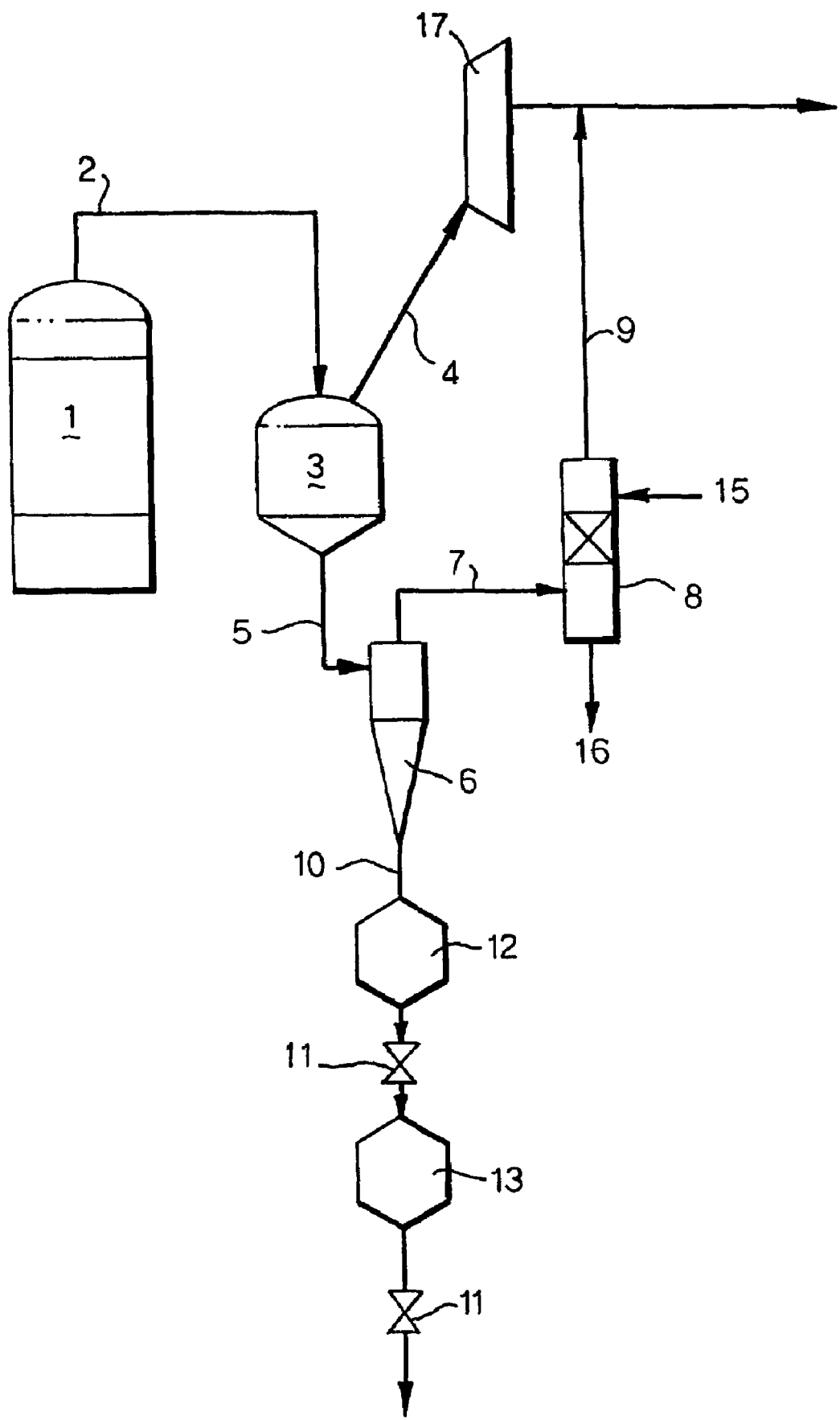

PROCESS TO SEPARATE SOLIDS FROM SOLIDS LADEN GASEOUS FLOW

PRIORITY CLAIM

The present application claims priority to European Patent Application No. 03077101.8 filed 3 Jul. 2003.

FIELD OF THE INVENTION

The field of the invention is fluidized catalytic cracking (FCC) of heavy hydrocarbon feeds, regeneration of said catalyst and separation of said catalyst from the flue gasses generated in said regeneration.

BACKGROUND OF THE INVENTION

U.S. Pat. No. 420,384 and U.S. Pat. No. 6,551,565 discloses processes to separate catalyst from FCC flue gasses.

A paper titled "FCCU Particulate Emissions Control with a Shell Third Stage Separator—A Case Study" as presented by Edwin H. Weaver, of Belco Technologies Corporation at the 2002 NPRA, New Orleans describes how catalyst fines are separated from the flue gas of a FCC regenerator. According this paper Third Stage Separators (TSS) have been utilized for many years to separate catalyst fines from the regenerator flue gas in order to protect turbo expanders installed downstream said separator. Typical third stage separators are for example described in Hydrocarbon Processing, January 1985, 51-54. For many years, the TSS has been used as an effective device to remove catalyst fines from the FCCU regenerator flue gas in order to provide protection for a turbo expander. In this service, it was critical that the TSS removes a sufficient quantity of the catalyst fines so that the remaining catalyst fines in the flue gas would not damage the turbo expander.

In a TSS solids are separated from the majority of the gas flow by means of a plurality of swirl tube separators operating in parallel within a common vessel. The solids content in the gas is lowered to for example 43 mg/Nm$^3$. The separated solids accumulate in the lower part of the vessel and are discharged from the vessel together with a small quantity of the flue gas. This solids rich flow is also referred to as the TSS underflow. This TSS underflow is then routed to a fourth stage separator. In the fourth stage separator solids are typically processed by a so-called 4th stage cyclones, or more recently, removed entirely by passing the gas through a cyclone, a ceramic or composite filter. In the latter case, the gas containing a small amount of particulates, for example 2 mg/Nm$^3$, is then routed back to the main flue gas flow downstream the TSS.

A disadvantage of the process as described in the above referred to conference paper is that an absolute filter has to be used to minimize the particulate emission from the process. These filters have the advantage that almost all solids can be separated from the underflow gasses. However these filters have the disadvantage that in addition to their high cost, the (ceramic) filter candles may break resulting in solids ending up in the flue gas. Metal filter candles have the disadvantage that they cannot be applied at the normal operating temperature of the process and gas cooling needs to be applied.

The aim of the present invention is to provide a process, which results in a flue gas having a low solids content wherein no absolute filters have to be used.

SUMMARY OF THE INVENTION

The invention is related to the following process. Process to separate solids from a solids laden gaseous flow containing more than 100 mg/Nm$^3$ solids by performing the following steps:

(a) separating solids from the gaseous flow using a gas-solids separator resulting in a gaseous flow containing less than 50 mg/Nm$^3$ solids and an underflow comprising the separated solids and part of the gaseous flow as fed to the gas-solids separator;

(b) separating part of the solids from the underflow in a cyclone wherein solids and a gaseous flow containing still some solids are obtained; and (c) contacting the gaseous flow obtained in step (b) with water to separate the solids and obtain a gaseous flow containing between 0 and 50 mg/Nm$^3$ solids; and (d) combining the gaseous flows which are poor in solids as obtained in step (c) and as obtained in step (a).

BRIEF DESCRIPTION OF THE DRAWINGS

FIG. 1 illustrates the process according to the present invention

DETAILED DESCRIPTION OF THE INVENTION

Applicants found that by combining a relatively simple and robust cyclone separator in step (b) and a water contacting in step (c) a more reliable process is obtained as compared to the state of the art ceramic filters.

The process according the invention is suited to separate solids from a solids laden gaseous flow containing more than 100 mg/Nm$^3$ solids. Preferably between 100 and 500 mg/Nm$^3$ solids are present in the feed. The gaseous flow as obtained in step (d) preferably contains less than 50 mg/Nm$^3$ solids and more preferably between 10 and 50 mg/Nm$^3$. The gaseous stream is preferably the flue gas of a FCC regenerator. However it may also be other gaseous streams requiring the above-described level of separation.

Step (a) is performed in a gas-solids separator, which may be a cyclone, a set of parallel operated swirl tubes or cyclones or by making use of a so-called multi-separator. Such multi-separators comprise a plurality of parallel operated cyclonic gas-solid separators positioned in one vessel. Such cyclonic separators may be of the swirl type or the types having a tangentially arranges gas-solids inlet opening. Examples of such multi-separators are the above referred to Third Stage Separator or the separators as described in U.S. Pat. No. 3,541,766, U.S. Pat. No. 5,690,709, U.S. Pat. No. 5,372,707, U.S. Pat. No. 5,514,271, and U.S. Pat. No. 6,174,339.

The above gas-solids separators will result in some kind of underflow which can be treated according the present invention.

Step (b) may be suitably performed in a conventional cyclone separator as for example described in FIG. 20-106 of Perry's Chemical Engineers' Handbook, McGraw Hill, 5th edition, 1973.

Step (c) may be suitably performed in a vessel wherein the gas flows counter-current to a flow of water. The water may contain other components. However to reduce the risk of dew point corrosion also an aqueous dilute alkaline solution may be used. Examples of possible solutions are dilute NaOH, KOH Mg(OH)$_2$ and NH$_4$OH. However for the purpose of the present invention solids are sufficiently removed making use of water containing no added components. The vessel may be provided with internals, which enhance the contacting between water and gas. The ratio of volume mass of water to volume mass of gas contacted in step (c) is preferably between 1.5 and 2.0. The contacting with water is preferably performed in a continuous mode of operation, wherein water flows counter-current the gas flow. The water flow as obtained after contacting may be re-used in the process of step (c). A small bleed stream of water and solids will ensure that no build up of solids above a certain solids content in the circulating water flow will result. The solids present in the water or the preferred bleed stream may be suitably separated from said water by means of a filtration system, for example a rotary filter, or may be disposed of via an ordinary refinery drainsystem.

The solids content in the gas after contacting with water in step (c) is smaller than 50 mg/Nm$^3$, preferably smaller than 20 mg/Nm$^3$ and more preferably smaller than 5 mg/Nm$^3$. The solids content may suitably be from 0 to 5 mg/NMm$^3$.

In step (d) the gaseous flows which are poor in solids as obtained in step (c) and as obtained in step (a). The resulting gas may be fed to an expander turbine, to a waste heat boiler or to a stack or combinations of such units.

DETAILED DESCRIPTION OF THE DRAWINGS

FIG. 1 shows a FCC regenerator 1 which produces a flue gas 2. These solids are separated from this flue gas 2 in Third Stage Separator 3. A gas poor in solids 4 is obtained and an underflow 5. Underflow 5 is fed to a cyclone separator 6 yielding solids flow 10 and a gas flow 7. This gas flow 7 is contacted in a vessel 8 with water 15. Solids are taken up in the water flow 15 resulting in a water flow 16 containing solids. The resulting gas flow 9 is almost free of solids and is combined with TSS effluent 4. Preferably gas flow 9 is combined with the TSS effluent 4 downstream of a Flue gas Expander turbine 17.

The solids flow 10 is continuously fed to a collecting vessel 12. From this vessel 12 solids may be discharged to the environment via lock-hopper vessel 13 provided with valves 11. A lock-hopper vessel is preferred in order to bring the solids from the elevated pressure level at which the process is operated to ambient pressure level in a non-continuous sluice operation, at which the solids can be handled further.

For illustrative purposes the solids content of the various streams is shown in Table 1 as an example of the present invention.

TABLE 1

| Stream | Solids content mg/Nm$^3$ |
|---|---|
| 2 | 150 |
| 4 | 29 |
| 5 | 2450 |
| 7 | 630 |
| 9 | 0-1 |

That which is claimed is:

1. A process to separate solids from a solids laden gaseous flow containing more than 100 mg/Nm$^3$ solids, the process comprising:
    (a) separating solids from the gaseous flow using a gas-solids separator resulting in a gaseous flow containing less than 50 mg/Nm$^3$ solids and an underflow comprising the separated solids and part of the gaseous flow as fed to the gas-solids separator;
    (b) separating part of the solids from the underflow in a cyclone wherein solids and a gaseous flow containing still some solids are obtained; and
    (c) contacting the gaseous flow obtained in step (b) with water in the absence of a filter to separate the solids and obtain a gaseous flow containing between 0 and 50 mg/Nm$^3$ solids; and
    (d) combining the gaseous flows which are poor in solids as obtained in step (c) and as obtained in step (a).

2. The process according to claim 1, wherein the solids laden gaseous flow contains between 100 and 500 mg/Nm$^3$.

3. The process according to claim 2, wherein the solids content in the gaseous flow as obtained in step (d) is between 10 and 50 mg/Nm$^3$ solids.

4. The process according to claim 3, wherein the gas-solids separator is a multi-separator vessel comprising of a plurality of parallel operated cyclonic gas-solids separators.

5. The process according to claim 4, wherein the ratio of mass of water to mass of gas contacted in step (c) is between 1.5 and 2.0.

6. The process according to claim 5, wherein the solids content in the gas after contacting with water in step (c) is smaller than 50 mg/Nm$^3$.

7. The process according to claim 6, wherein the solids content in the gas after contacting with water in step (c) is between 0 to 5 mg/Nm$^3$.

8. The process according to claim 7, wherein the gas flow containing less than 50 mg/Nm$^3$ solids as obtained in step (a) is fed to a gas expander turbine and wherein step (d) is performed downstream said gas expander turbine.

9. The process according to claim 8, wherein the solids as obtained in step (b) are continuously fed to a collecting vessel, from which vessel the solids are discharged non-continuously to the environment via a lock-hopper vessel.

* * * * *